(No Model.)

S. D. ENGLE.
FLOWER JAR.

No. 599,996. Patented Mar. 1, 1898.

WITNESSES:
Donn Twitchell
Isaac Wray

INVENTOR
S. D. Engle
BY
ATTORNEYS.

THE NORRIS PETERS CO., PHOTO-LITHO., WASHINGTON, D. C.

UNITED STATES PATENT OFFICE.

STEPHEN D. ENGLE, OF HAZLETON, PENNSYLVANIA.

FLOWER-JAR.

SPECIFICATION forming part of Letters Patent No. 599,996, dated March 1, 1898.

Application filed November 29, 1897. Serial No. 660,085. (No model.)

*To all whom it may concern:*

Be it known that I, STEPHEN D. ENGLE, of Hazleton, in the county of Luzerne and State of Pennsylvania, have invented a new and Improved Flower-Jar, of which the following is a full, clear, and exact description.

This invention is a flower-jar constructed of porous material and having a cavity for the reception of water, by which the plants may be nourished, the jar being formed so as to permit the roots and earth to be laid and held around its outer surface, thus presenting the appearance of a solid mass of earth and plants.

This specification is the disclosure of two forms of my invention, while the claims define the actual scope of the invention.

Reference is to be had to the accompanying drawings, forming a part of this specification, in which similar characters of reference indicate corresponding parts in all the figures.

Figure 1:
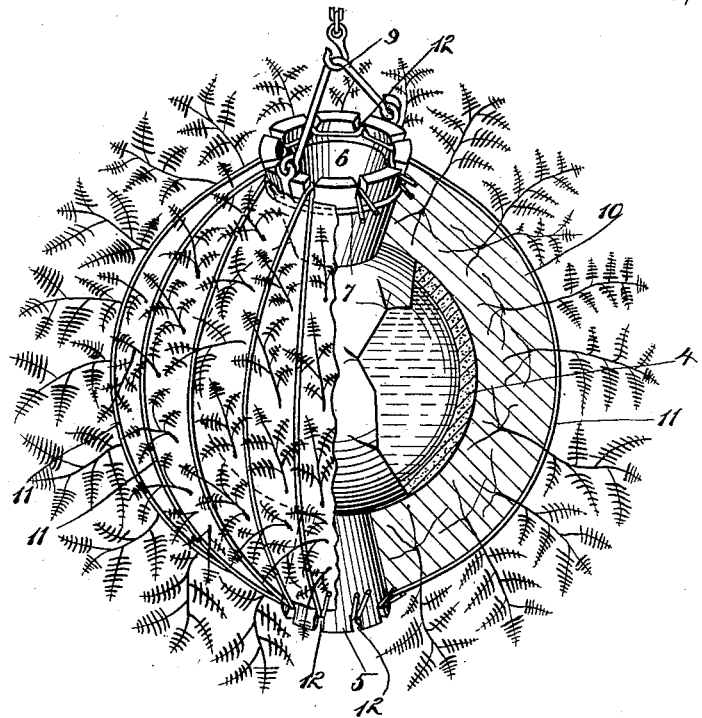
Figure 2:
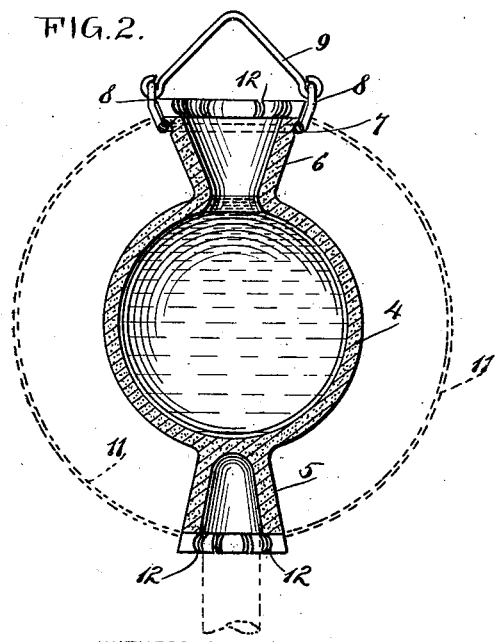

Figure 1 is a perspective view of the invention with parts broken away. Fig. 2 is a vertical section thereof, and Fig. 3 is a similar view of a modified form of the invention.

The jar in Figs. 1 and 2 has a globular main portion or reservoir 4, from which downwardly projects a socket 5 and from which upwardly projects a neck 6, forming means by which communication may be had with the main portion or reservoir 4. The neck 6 flares upwardly and is provided near its mouth with an annular groove wherein is laid a wire 7, with ears 8 formed thereon. The ears 8 project above the neck 6 and carry a bail 9, by which the device may hang from a hook or other suitable support, as shown in Fig. 1.

The roots and earth represented by the lines 10 are molded around the reservoir 4, conforming to the surface thereof, so as to give the roots and earth a spherical form. The plants project out from the roots and earth, as Fig. 1 shows. The roots and earth are held in position by means of longitudinal wires 11, that extend over the surface of the roots and earth and are wound in and out of the recesses 12, formed, respectively, in the edges of the neck 6 and in the edges of the socket 5. The earth is placed against the reservoir 4 and secured by the wires 11 as fast as the earth is accumulated. The fastening of the wires may be effected by any convenient turn of the wire in and out of the recesses 12. When the device is finished, the wire is hid by the plants and the jar presents the appearance of a solid ball of vegetation. If desired, the bail 9 may not be used and the jar may be supported by a staff inserted in the socket 5, as indicated by dotted lines in Fig. 2.

Figure 3:
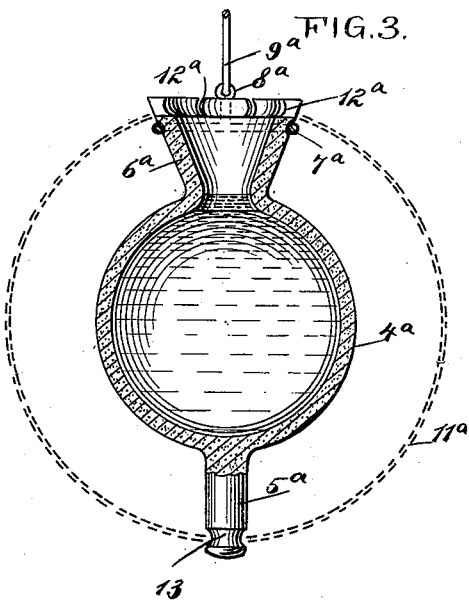

The form of the invention shown in Fig. 3 has the reservoir $4^a$, similar to the reservoir 4 in Figs. 1 and 2. The neck $6^a$ carries an annular wire $7^a$, with ears $8^a$ to hold a bail $9^a$. Instead of the socket 5 of Figs. 1 and 2, the form in Fig. 3 is simply a trunnion-like projection $5^a$, with a groove 13, to which the wires $11^a$ are attached instead of to the recesses 12 in the socket 5 of Figs. 1 and 2. The upper edge of the neck $6^a$ has recesses $12^a$ similar to the recesses 12 of the neck 6 and carrying therefore the wires $11^a$, as will be understood. This form of the invention is adapted only to be hung from the bail 9 and differs from that of Figs. 1 and 2, since the jar in Figs. 1 and 2 may be both hung from above or supported rigidly from beneath.

Having thus described my invention, I claim as new and desire to secure by Letters Patent—

1. A flower-jar having a main portion or reservoir, a neck projected from the main portion or reservoir and communicating with the interior thereof, the neck having notches in its mouth, and a socket projected from the main portion or reservoir oppositely to the neck, the socket being capable of receiving a staff to support the jar, and the socket having notches therein, the notches of the neck and socket being capable of receiving fastening-strands for securing plants to the exterior of the main portion or reservoir.

2. A jar having a main portion or reservoir, a neck projected upward from the main portion or reservoir and communicating with the interior thereof, the neck having the edges of its mouth notched, and an extension projecting downward from the jar oppositely to the neck, the extension being capable of having strands attached thereto, and the notches of the neck also serving for the attachment of said strands whereby earth may be held to surround the surface of the jar and the sides of the neck and extensions.

STEPHEN D. ENGLE.

Witnesses:
CHRIST. BACHMAN,
A. M. EBY.